US005139835A

United States Patent [19]

[11] Patent Number: 5,139,835

Kitamura et al.

[45] Date of Patent: Aug. 18, 1992

[54] SYNTHETIC RESIN LAMINATED PAPER

[75] Inventors: Ryoichi Kitamura; Shuzo Ohara, both of Osaka, Japan

[73] Assignee: Goyo Paper Working Co., Ltd., Osaka, Japan

[21] Appl. No.: 647,882

[22] Filed: Jan. 30, 1991

[30] Foreign Application Priority Data

Feb. 2, 1990 [JP] Japan .................................... 2-24694

[51] Int. Cl.[5] .......................... B32B 9/04; B32B 23/08

[52] U.S. Cl. ........................................ 428/42; 428/41; 428/448; 428/513; 528/15

[58] Field of Search .................... 428/448, 513, 41, 42; 528/15

[56] References Cited

U.S. PATENT DOCUMENTS 4,780,348 10/1988 Yamamoto et al. .............. 428/41 X
4,808,454 2/1989 Saitoh ............................... 428/41 X

FOREIGN PATENT DOCUMENTS

86/00564 1/1986 World Int. Prop. O. .

*Primary Examiner*—P. C. Sluby
*Attorney, Agent, or Firm*—Sughrue, Mion, Zinn, Macpeak & Seas

[57] ABSTRACT

A synthetic resin laminated paper is disclosed which comprises a synthetic resin film layer and a paper layer, the improvement wherein an adhesion-release control agent layer is interposed between the film layer and said paper layer. The synthetic resin laminated paper of the present invention can be easily separated into a laminated film and a paper by a mechanical treatment within a shortened period of time with minimum consumption of energy. Moreover, the pulverization of the laminated film is prevented and thus operation efficiency of separation is enhanced.

7 Claims, No Drawings

SYNTHETIC RESIN LAMINATED PAPER

BACKGROUND OF THE INVENTION

1. Field of the Invention

The present invention relates to a synthetic resin laminated paper, and, more particularly, relates to a synthetic resin laminated paper which makes it possible to recover paper (or laminated film) materials easily and rationally.

2. Description of the Prior Art

Today, it is generally carried out that used papers are widely restored to paper materials, and that various synthetic resin laminated papers are separated into laminated films and papers, and the papers being reused as paper materials, in view of effective utilization of forest resources and forest and environmental protection.

As for the latter, polyethylene resin laminated papers are widely used for general wrapping, packaging in a form of carton paper containers for juice and milk, and furthermore, one-way (disposable) use paper cups, and the like.

With regard to recovery of this polyethylene resin laminated paper, there are two cases; polyethylene recovery and paper or pulp recovery, but in either case, separating the resin film from the paper is an important problem.

Although the separation of a resin film from paper has conventionally been investigated through such methods as a pre-treatment for better water permeation and a mechanical separation of a resin film from paper, the former does not give sufficient effects while the latter poses such problems as requiring not only a long period of time for mechanical treatment that necessitates greater energy consumption, but also pulverizing of paper and film because of the mechanical treatment for a long period of time, thus resulting in difficulties in separating the film from the paper and, consequently, in recovering them for reuse.

SUMMARY OF THE INVENTION

An object of the present invention is to provide a synthetic resin laminated paper which can be easily separated into a resin film and a paper by a mechanical treatment within a shortened period of time with minimum consumption of energy.

Another object of the present invention is to prevent the pulverization of a resin film separated from a paper during a mechanical treatment, which enhances operation efficiency of separating the film from the paper.

Other objects and advantages will become apparent to those skilled in the art from the following detailed description.

The present inventors have made an extensive series of studies and found that the above objects can be attained by interposing an adhesion-release control agent layer between a resin film layer and a paper.

DETAILED DESCRIPTION OF THE INVENTION

The present invention provide a synthetic resin laminated paper comprising a synthetic resin laminated layer and a paper layer, the improvement wherein an adhesion-release control agent layer permitting easy separation of the synthetic resin film layer from the paper layer is interposed between said laminated layer and said paper layer.

The adhesion-release control agent used in the present invention is one for permitting easy separation of a synthetic resin film layer from a paper layer, and includes, for example, wax, polyvinyl alcohol, partially saponified ethylene-vinyl acetate copolymers, ethylene-vinyl acetate copolymers, polyacrylic polymers or copolymers, or mixtures of the foregoing, a modified silicone compound which consists of an organopolysiloxane compound having at least one hydrogen atom and a hydrocarbon compound having at least one double bond being reactive with said hydrogen atom.

As the organosilicic compound having at least one hydrogen atom, there are included, for example, polymethyl hydrogen siloxane, and methyl hydrogen siloxane-dimethyl siloxane copolymer.

As the hydrocarbon compound having at least one double bond being reactive with hydrogen atom of said organopolysiloxane compound, there are included, for example, α-olefin, polyethylene wax, 1, 4-polybutadiene, 1, 2-polybutadiene, polybutene, 1-octadecene, and mixtures of the foregoing.

To mention one example of a production method of said modified silicone compound, an addition reaction is carried out by mixing an α-olefin having one vinyl group at its end and a polymethyl hydrogen siloxane (also including methyl hydrogen siloxane-dimethyl siloxane copolymer), adding chloroplatinic acid as a catalyzer, and heating. The reaction product obtained is dried after having been washed and refined with acetone and the like several times.

As a method of using said adhesion-release control agent, there are included, for example, the following methods;

(1) lamination by extruding or hot melt coating a mixture of an adhesion-release control agent and a synthetic resin between film and paper, (2) coating said agent onto the surface of film, (3) coating said agent onto the surface of paper, and (4) paper making by mixing said agent into paper.

In the method (1), as far as the synthetic resins are concerned, there is no limitation if those are synthetic resins which are capable of extrusion or hot melt coating. As examples, olefin resins such as polyethylene and polypropylene are preferable. As a mixing ratio, a range of 2–10% by weight is preferable in case of wax; a range of 5–50% by weight is preferable in case of polyvinyl alcohol, partially saponified ethylene-vinyl acetate copolymers, ethylene-vinyl acetate copolymers, polyacrylic polymers or copolymers, or mixtures of the foregoing; while a range from 0.5 to 6% by weight is preferable in case of a modified silicone compound, although it can not be simply specified as it depends on the silicone content (a ratio of an organosilicone contained in molecule).

As the coating method in (2) or (3), an adhesion-release control agent can be applied as an emulsion of a proper concentration or as a solution of a proper concentration in a solvent, and in the method of (3), coating can be performed together with a surface sizing. That is, a sizing liquid in which an adhesion-release control agent is added to sizing agents such as glue, starch, carboxylmethyl cellulose, polyvinyl alcohol and alkylketene dimer can be applied onto a single side or both sides of paper by a sizing press roll. In the method of (4), an emulsion of an adhesion-release control agent, for example, can be applied to a paper making step together with inner sizing agents such as rosin, paraffin wax latex and petroleum resin.

In the present invention, there is no limitation for a resin film and paper, but polyethylene is a representative material for the resin film.

The present invention will be explained in more detail below based on examples and comparison examples, but it is needless to say that the present invention is not limited thereby.

In the following description, the terms, "%" and "parts" stand for "% by weight" and "parts by weight", respectively, unless otherwise specified.

REFERENCE EXAMPLE

(Synthesis of a Silicone-Based Adhesion-Release Control Agent)

25.2 parts of polymethyl hydrogen siloxane (P=600, MW=44,000), 74.8 parts of α-olefin ("DIALEN-30", manufactured by Mitsubishi Kasei Co. Ltd., MW=650), and 3 parts of 0.1% $H_2PtCl_6.6H_2O$ isopropyl alcohol solution were charged into a reactor and subjected to an addition reaction for 5 hours at 120° C., and further allowed to react for 6 hours at 120° C. After cooling, the generated reaction product thus solidified was washed and refined with acetone 5 times to thus remove unreacted parts. The silicone content of the adhesion-release control agent thus obtained was 25.2%.

EXAMPLE 1

A compound for a adhesion-release control agent layer was prepared at a die temperature of 190° C. of a pelletizer, by adding 1.5% of the adhesion-release control agent as obtained by Reference Example to a low density polyethylene resin ("MIRASON-16sp", manufactured by Mitsui Sekiyu Kagaku Industries Ltd., MI: 4.5 g/10 minutes, density: 0.923 g/cm$^3$).

Meanwhile, the same low density polyethylene resin as above was separately used as the resins for a container surface printing layer and a liquid contact surface layer.

As a base material, a base paper material for a mild carton (manufactured by Weyerhaeuser Paper Company, weight: 340 g/cm$^2$) was used.

Lamination was carried out by a tandem laminator equipped with a conventional co-extruder.

The liquid contact surface layer was made, using a miller roll for a cooling roll and a co-extruding die, by co-extruding the compound for the adhesion-release control agent layer at a die temperature of 330° C., and simultaneously extruding the resin for the liquid contact surface layer at a die temperature of 300° C. Then, inverting it, the container surface printing layer was made, using a matte roll for a cooling roll and a co-extruding die as well, by co-extruding the compound for the adhesion-release control agent layer at a die temperature of 330° C., and simultaneously extruding the resin for the container surface printing layer at a die temperature of 330° C.

By the manner as mentioned above, a laminated body of a 5-layer structure was made, which comprises a surface printing layer/an adhesion-release control agent layer/a paper base material layer/an adhesion-release control agent layer/a liquid contact surface layer. The thickness of the surface printing layer was 10 μm, that of the liquid contact surface layer 30 μm, and that of the adhesion-release control agent layer 10 μm, respectively.

By using the 5-layer laminated body thus obtained, a Gable-top type milk carton with a capacity of 1000 ml was produced by a carton making machine. The obtained milk carton passed standards test for polyethylene-laminated paper container packaging.

Meanwhile, for the purpose of evaluating used paper recycle, the 5-layer laminated body for the milk carton was cut into 500 g, 6,600 ml of water were added, the mixture was heated to 50° C., and its pH was adjusted to 12 with sodium hydroxide. The mixture was put into a mixer for business use and subjected to a mechanical treatment. After the resin film layer and a paper were almost separated from each other, the pH was adjusted to 9 with sulphuric acid, then 0.7% of sodium hypochlorite in terms of effective chlorine was added and the mixture was stirred again for several minutes. The resin film layer and the paper were completely separated. The results are shown in Table 1.

COMPARISON EXAMPLE 1

Using the same low density polyethylene resin as used in Example 1, the same procedure as in Example 1 was repeated, except that the adhesion-release control agent was not added to the adhesion-release control layer. The results are shown in Table 1.

TABLE 1

| | Adhesion strength of paper/resin film layer | Mechanical treatment time (min) for separation | | Pulverization of resin film |
|---|---|---|---|---|
| | | After adding sodium hydroxide | After adding sodium hypochlite | |
| Example 1 | Failure between paper layers | 12 | 3 | No pulverization was observed. |
| Comparison Example 1 | Failure between paper layers | 23 | 5 | Pulverization was observed. |

As is apparent from the results of the Table 1, according to Example 1, the time required for separation between a resin film layer and a paper is reduced to about ½, as compared with Comparison Example 1. In consequence, mechanical energy can be remarkably saved and, at the same time, owing to a decrease in mechanical treatment time, pulverization of a resin film layer by said treatment can be prevented, and therefore, efficiency of a separating process between a resin film layer and a paper is remarkably enhanced.

EXAMPLE 2

To 60 parts of a low density polyethylene resin ("MIRASON-10p", manufactured by Mitsui Sekiyu Kagaku Industries Ltd., MI: 9.5 g/10 minutes, density: 0.917 g/cm$^3$), 30 parts of a polyvinyl alcohol for melt molding ("GOHSENOL MK-05", manufactured by Nippon Gosei Kagaku Industry Co., Ltd., polymerization degree: 500, saponification degree: 72%, density: 1.27 g/cm$^3$, MP: 170° C.) which was preliminarily subjected to vacuum drying (temperature: 105° C., pressure: −75.8 cmHg, time: 5 hours) as an adhesion-release control agent and 10 parts of an ethylene-vinyl acetate copolymerized resin ("EVAFLEX V-250", manufactured by Du Pont-Mitsui Polychemicals Co., Ltd., content of vinyl acetate: 28%, MI: 15 g/10 minutes, density: 0.95 g/cm$^3$) were dry-blended, then the blended mixture was subjected to continuous kneading extrusion by an extruder ("KCK 120×2-65 VEX", manufactured by KCK Co., Ltd.) at a die temperature of 180° C. to prepare pellets for an adhesion-release control agent layer. The pellets were then thoroughly dried in a vacuum drier (temperature: 105° C., pressure: −75.8 cmHg, time: 5 hours).

On the other hand, a base paper material for cups (manufactured by Chuetsu Pulp Industry Co., Ltd., weight: 200 g/m$^2$) was used as a base material and the same low density polyethylene resin ("MIRASON-16 sp") as employed in Example 1 was used as a resin for synthetic resin laminate.

Lamination was carried out by a co-extruder. The compound for the adhesion-release control agent layer was extruded to the paper base material side at a die temperature of 230° C. and the low density polyethylene resin was simultaneously extruded to a cooling roll (matte surface) side at a T-die temperature of 250° C., to thus prepare a 3-layer laminated body as set forth below:

M-16 sp 13 μm/adhesion-release control agent layer/paper base material for cups

EXAMPLE 3

The same co-extrusion was carried out as in Example 2, except that a control agent layer compound consisting of 80 parts of the low density polyethylene resin ("MIRASON-10p") and 20 parts of the polyvinyl for melt molding ("GOHSENOL MK-05") as an adhesion-release control agent were employed, without using the ethylene-vinyl acetate copolymerized resin. The obtained laminated body was as set forth below:

M-16 sp 13 μm/adhesion-release control agent layer 7 μm/paper base material for cups

COMPARISON EXAMPLE 2

The low density polyethylene resin ("MIRASON-16 sp") was directly extruded at a T-die temperature of 330° C. onto the paper base material by a single extruder, without using the adhesion-release control agent layer as used in Example 2, to thus prepare a laminated body as shown below, which is usually used for cups.

M-16 sp 20 μm/paper base material for cups

EXAMPLE 4

An adhesion-release control agent solution was prepared which contained 20% (in terms of solid) of a polyvinyl alcohol ("GOHSEFIMER LL-02", manufactured by Nippon Gosei Kagaku Industry Co., Ltd., saponification degree: 45~51 mol %) in a mixed solution of water and methanol (weight ratio: 1/1).

Then, the adhesion-release control agent solution as prepared above was applied to a kraft paper (weight: 75 g/m$^2$) as a paper base material in an amount of 15 g/m$^2$ (wet base) by a bar coater and dried at 100° C. for 30 seconds to thus obtain the paper base material provided with the adhesion-release control agent layer thereon.

Next, the coating surface of the paper base material was subjected to a corona discharge treatment, on the surface of which the low density polyethylene resin was extruded at a die temperature of 340° C. to thus obtain a polyethylene laminated paper for packaging.

The thickness of the polyethylene resin layer of the obtained polyethylene laminated paper was 20 μm and it had satisfactory laminate strength, water- and moistureproofing required for packaging.

COMPARISON EXAMPLE 3

The kraft paper was subjected to a corona discharge treatment, on the surface of which the low density polyethylene resin ("MIRASON-16sp") was extruded in a thickness of 20 μm under the same conditions as in Example 4, without using the adhesion-release control agent, to thus obtain a polyethylene laminated paper for packaging.

EXAMPLE 5

An emulsion type adhesive of an acrylic copolymer ("MOVINYL S-72", manufactured by Hoechst Gosei Co., Ltd., solid content: 49%) was used as an adhesion-release control agent. This emulsion type adhesive was applied to a kraft paper (weight: 50 g/m$^2$) in a coated amount of 20 g/m$^2$ (wet base) by a gravure kiss-reverse coater to form an adhesion-release control agent layer. Then, a non-oriented polypropylene film (thickness: 20 μm) was subjected to corona discharge treatment on its surface and it was positioned for its corona discharge treated surface to face the coated surface of the kraft papaer before being dried, and then they were bonded together by a pressing roll at a linear pressure of 15 Kg/cm, followed by drying at 100° C. for 60 seconds. A laminated body consisting of the kraft paper and the non-oriented polypropylene film was obtained.

COMPARISON EXAMPLE 4

Onto the corona discharge treated surface of the same non-oriented polypropylene film as used in Example 5, a mixture of a polyester-urethane adhesive (dissolved in a solvent) ("LX-605", manufactured by Dainippon Ink Industry Co., Ltd.) and an isocyanate curing agent ("KW40", manufactured by Dainippon Ink Industry Co., Ltd.) at the mixing ratio by weight of 5:1 was applied by a gravure coater in a coated amount of 3 g/m$^2$ (dry base) and dried at 80° C. for 30 seconds. The obtained non-oriented polypropylene film was positioned for its coated surface to face a kraft paper (weight: 50 g/m$^2$) and they were bonded together by a pressing roll heated to 100° C. at its surface at a linear pressure of 15 Kg/cm to thus obtain a laminated body consisting of the kraft paper and the non-oriented polypropylene film, which is similar in structure to that of Example 5.

Evaluation of separation ratio:

The laminated bodies obtained by Examples 2–5 and Comparison Examples 2–4 were evaluated for separation ratio by the following method. The results are given in Table 2.

Evaluation method:

Each sample was cut into 5 cm×5 cm and approximately 50 g from each of the laminated bodies and immersed in water for 5 hours. After immersion, the sample was charged into a standard pulp disaggregation machine (manufactured by Kumagai Riki Industry Co., Ltd., capacity: 2 l, rotation: 3000 rpm) together with 2 l of water and stirred for a given period of time.

After stirring, an amount of fibers of a paper base material which remained without being disaggregated and adhered to a resin film was measured by the method as set forth below:

Firstly, after stirring, the resin film is taken up without being deposited by the fibers, separated off and dispersed in water, of the paper base material, then dried (by a gear oven drier at 100° C. for 1 hour) and weighed [$W_1$ (g)].

Next, the so weighed resin film is immersed in a 20% sodium hydroxide aqueous solution to thus remove the fibers of the paper base material completely, and only the resin film is washed, dried and then weighed [$W_0$ (g)].

According to the following equations, a residual amount of fibers [W (g)] and a separation ratio (%) are calculated.

$$\text{Residual amount of fibers } [W(g)] = W_1(g) - W_0(g)$$

$$\text{Separation ratio (\%)} = \frac{\begin{array}{c}\text{weight of the paper}\\ \text{base material}\\ (g/m^2)\end{array} - \dfrac{\text{residual amount of fibers } W(g)}{\text{area of sample } (m^2)}}{\text{weight of the paper base material } (g/m^2)} \times 100$$

TABLE 2

| Sample | Stirring time (minutes) 1 | 3 | 5 | 10 |
|---|---|---|---|---|
| Example | | | | |
| 2 | 100 | — | — | — |
| 3 | 94 | 100 | — | — |
| 4 | 100 | — | — | — |
| 5 | 96 | 100 | — | — |
| Comp. Example | | | | |
| 2 | 63 | 84 | 95 | 100 |
| 3 | 58 | 81 | 92 | 100 |
| 4 | 57 | 79 | 90 | 98 |

Note: Figures in the above table show a separation ratio (%).

As described above, according to the present invention, the separation between a resin film and a paper is made easy, and a mechanical treatment time is markedly shortened. In consequence, energy is not only saved, but pulverization of the paper and the resin film can also be avoided. Furthermore, separation of both materials and after-treatments are made easy, which enhances operation efficiency surprisingly.

What is claimed is:

1. In an easily recoverable synthetic resin laminated paper comprising a synthetic resin film layer and a paper layer, the improvement wherein the easily recoverable synthetic resin laminated paper consists essentially of the synthetic resin film layer, the paper layer and an adhesion-release control agent layer permitting easy separation of the synthetic resin film layer from the paper layer interposed between said synthetic resin film layer and said paper layer.

2. The synthetic resin laminated paper of claim 1, wherein the adhesion-release control agent layer comprises a resin layer in which the adhesion-release control agent is mixed with a polyethylene resin.

3. The synthetic resin laminated paper of claim 1, wherein the adhesion-release control agent layer comprises a coating layer in which the adhesion-release control agent is directly coated on the synthetic resin film layer and/or the paper layer.

4. The synthetic resin laminated paper of claim 1, wherein the adhesion-release control agent comprises the reaction product of an organopolysiloxane compound having at least one hydrogen atom and a hydrocarbon compound having at least one double bond which has reacted with said hydrogen atom.

5. The synthetic resin laminated paper of claim 1, wherein the synthetic resin film layer comprises a polyethylene resin layer.

6. The synthetic resin laminated paper of claim 1, wherein the adhesion-release control agent comprises polyvinyl alcohol.

7. The synthetic resin laminated paper of claim 1, wherein the adhesion-release control agent is a silicone-based adhesion-release control agent.

* * * * *